United States Patent [19]

Tobey

[11] Patent Number: 4,812,733
[45] Date of Patent: Mar. 14, 1989

[54] COMPUTER ELEMENT PERFORMANCE ENHANCER

[76] Inventor: Richard Tobey, 648 Sheraton Dr., Sunnyvale, Calif. 94087

[21] Appl. No.: 114,074

[22] Filed: Oct. 27, 1987

[51] Int. Cl.$^4$ ............................................. G05F 1/46
[52] U.S. Cl. ................................... 323/285; 323/907; 364/488; 357/87; 361/386; 361/388
[58] Field of Search ............... 323/282, 283, 284, 285, 323/907; 363/14, 383, 386, 388; 364/707, 708, 488; 357/81, 82, 83, 87; 174/50.5, 50.51

[56] References Cited

U.S. PATENT DOCUMENTS 4,685,081  8/1987  Richman ............................... 357/87

OTHER PUBLICATIONS

Skobern, J. R. "Thermoelectrically Cooled Module", IBM Technical Disclosure Bulletin, vol. 27, No. 1A, Jun. '84, p. 30.

Primary Examiner—Peter S. Wong
Attorney, Agent, or Firm—Thomas E. Schatzel

[57] ABSTRACT

A computer element performance enhancer having peltier device providing cooling to the critical computer elements of a desk top computer. A peltier device controller regulates the flow of power to the peltier device such that the computer elements are maintained in a below ambient temperature range. An adjustable power supply is connected to and supplies power to the critical computer elements. A power supply controller regulates the adjustable power supply such that a local voltage at the computer elements is maintained at a precision high voltage range. A dual speed clock generator is connected to the computer elements and runs the computer elements at a higher rate of speed when the computer elements are within the prescribed temperature and voltage ranges.

15 Claims, 2 Drawing Sheets

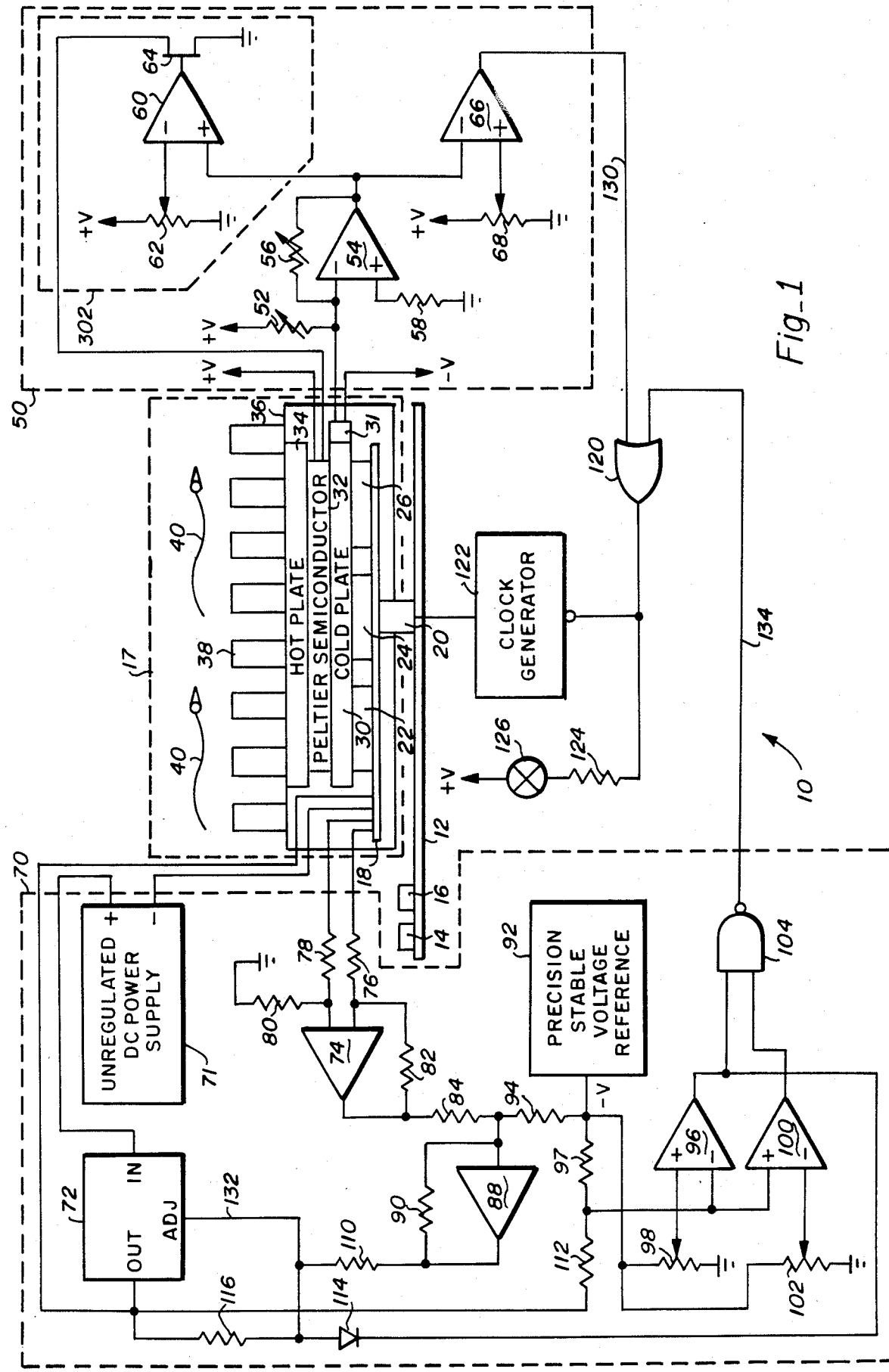
Fig_1

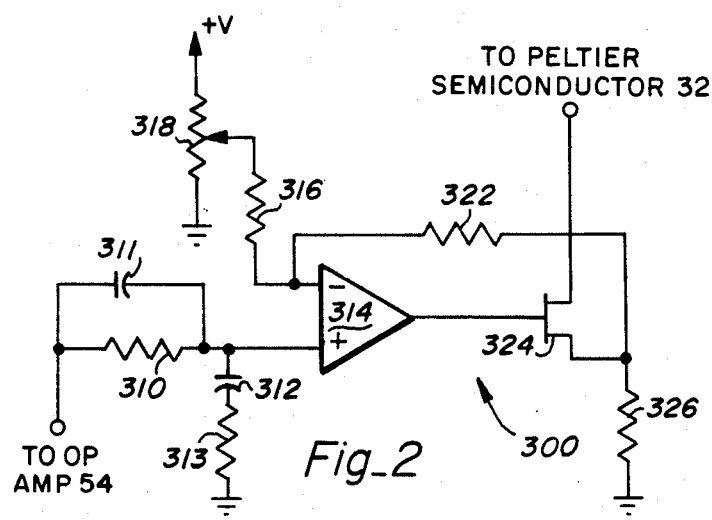
Fig_2
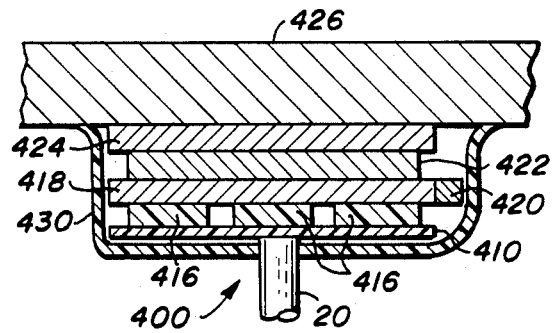
Fig_3
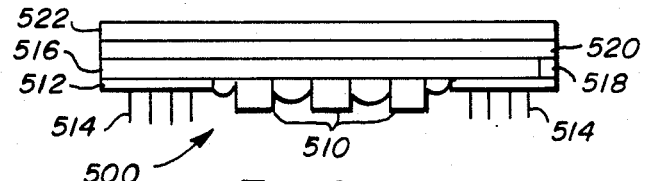
Fig_4
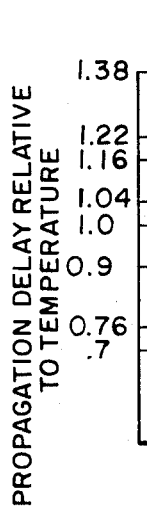
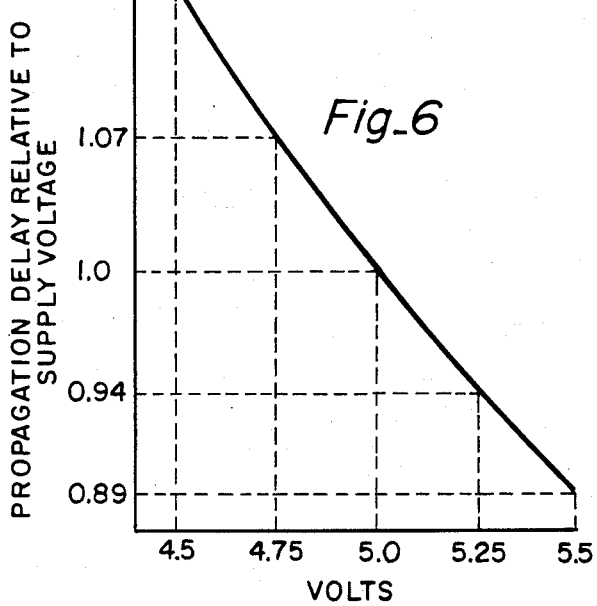
Fig_5
Fig_6

COMPUTER ELEMENT PERFORMANCE ENHANCER

BACKGROUND OF THE INVENTION

1. Field of the Invention

This invention relates generally to computer element performance enhancers and more specifically to devices which increase the performance of semiconductor computer elements by regulating their temperature and voltage.

2. Description of the Prior Art

In the electronics field, it is very important that electrical devices are prevented from overheating and that their power supplies are properly regulated. Various prior art cooling devices include U.S. Pat. Nos. 2,777,975 by P. Aigrain; 2,984,077 by H. Gaskill; 4,253,515 by E. Swiatosz; and 4,375,157 by G. Boesen. Some examples of power regulating devices include U.S. Pat. Nos. 3,952,240 by G. Ruumpol; 4,200,833 by A. Wilkerson; 4,442,339 by T. Mizuno, et al; 4,594,541 by H. Schott; and 4,622,511 by B. Moore.

The semiconductor computing elements which are part of personal or departmental sizes of computers are specified to work over a wide range of temperatures, such as zero to eight-five degrees centigrade. This is because controlling the environment to tighter limits has been assumed to be too expensive for all but the largest type of computer. For example, the ETA-10 supercomputer from ETA Systems, Inc. uses liquid nitrogen to refrigerate the CPU boards, but at a cost of several million dollars. Also, some semiconductor processes (such as bipolar) which were used for fast computers prior to the advent of CMOS technology, did not show pronounced speed improvement when operated at lower temperatures. The chief purpose of cooling systems in mainframe computers has been not so much to speed up operation of the components, but to be able to dissipate the heat produced when they are packed close together in order to reduce lead length delays.

Today, small desk top computers are becoming widely accepted in such areas as artificial intelligence, CAD/CAM and desk top publishing. Users of such systems reach the limit of their machines and want to move to a more powerful model with a minimum of change. These state of the art desk top computers are increasingly being made with CMOS technology. Examples of CMOS technology include the 80386 family of microprocessors from Intel Corporation, the 68000 family of microprocessors from Motorola Corporation and the new RISC microprocessor devices from Advanced Micro Devices Corporation and Sun Microsystems Corporation. Modern computer architecture concentrates these power producing parts of the computer into a few of these key computer elements. These CMOS devices show great improvement in performance when operated at lower temperatures and higher voltages.

However, up until the present time, it has not been deemed to be practical to provide below ambient temperature cooling and more precise voltage regulation to these desk top computer elements.

SUMMARY OF THE PRESENT INVENTION

It is therefore an object of the present invention to increase the performance of the critical computer elements of desk top computers.

It is a further object of the present invention to provide a low cost and practical environmental and voltage control for critical computer elements.

Briefly, in a preferred embodiment, the present invention comprises an environmental controller, a power controller and a clock generator. The environmental controller comprises a peltier device which is connected to a computer element. A temperature sensor is connected to the peltier device and generates a temperature signal. A peltier device controller is connected to the peltier device and the temperature sensor and regulates the flow of power to the peltier device responsive to the temperature signal from the temperature sensor. The peltier device controller generates an environmental control ready signal when the temperature signal indicates that the peltier device is below a predetermined temperature.

The power controller comprises an adjustable power supply which is connected to the computer element. A power supply controller is connected to the adjustable power supply and the computer element and regulates the voltage of the adjustable power supply responsive to a local voltage of the computer element such that said local voltage maintains a predetermined voltage range. The power supply controller generates a power controller ready signal when said local voltage is within the predetermined voltage range.

A clock generator is connected to the environmental controller, the power controller and the computer element. The clock generator is able to generate a high or low frequency clock signal and send it to the computer element. When both the environmental controller ready signal and the power controller ready signal are received, the clock runs at the high frequency. Otherwise, the clock runs at the low frequency.

An advantage of the present invention is that it increases the performance of the critical computer elements of desk top computers.

Another advantage of the present invention is that it provides a low cost and practical environmental and voltage controller for critical computer elements.

These and other objects and advantages of the present invention will no doubt become obvious to those of ordinary skill in the art after having read the following detailed description of the preferred embodiments which are illustrated in the various drawing figures.

IN THE DRAWINGS

FIG. 1 is a circuit block diagram of a computer element performance enhancer of the present invention;

FIG. 2 is a diagram of an alternative embodiment of a portion of the environmental controller of FIG. 1;

FIG. 3 is a cross-sectional view of an alternative embodiment of the peltier device;

FIG. 4 is a diagram of another alternative embodiment of the peltier device;

FIG. 5 is a graph of propagation delay versus temperature in a computer element; and FIG. 6 is a graph of propagation delay versus voltage in a computer element.

DETAILED DESCRIPTION OF THE PREFERRED EMBODIMENT

FIG. 1 shows a diagram of a computer element performance enhancer of the present invention and is designated by the general reference number 10. A mother board 12 contains a number of computing devices, e.g. devices 14 and 16. Within a temperature controlled environment apparatus referred to by the general reference character 17 is a daughter board 18 connected to the mother board 12 by a connector 20. A number of CMOS computer elements 22, 24 and 26 are connected to daughter board 18. These computer elements 22, 24 and 26 are the peformance critical computer elements of a desk top computer. The mother board 12 supports the other essential parts of the computer, such as the main memory, I/O controllers, etc.

A cold plate 30 is attached to the top of computer elements 22, 24 and 26. Cold plate 30 is made of a material of high thermal conductivity. A temperature sensor 31 is connected to cold plate 30. Sensor 31 is a semiconductor device, the current of which is proportional to absolute degrees Kelvin. A thermistor could also be used. A peltier effect semiconductor 32 is attached to cold plate 30 and a hot plate 34 is attached to the opposite side of the peltier semiconductor 32. Hot plate 34 is also made of a material having a high thermal conductivity.

An enclosure 36 surrounds and hermetically seals the computer elements 22, 24 and 26, cold plate 30, temperature sensor 31, peltier semiconductor 32 and hot plate 34. Hot plate 34 is attached to the top of enclosure 36. Enclosure 36 has a number of fins 38 and is kept near ambient temperature by an air flow 40 over the fins 38. Enclosure 36 has a top surface which is made of a material of high thermal conductivity to allow heat to pass from the hot plate 34 to fins 38. The other sides of enclosure 36 are made of an insulating material. Enclosure 36 is filled with inert gas or dry air in order to prevent condensation.

An environmental controller 50 is connected to the peltier semiconductor 32 and the temperature sensor 31. An adjustable resistor 52 is connected between a positive voltage +V and sensor 31. An operational amplifier 54 is connected to the resistor 52. An adjustable resistor 56 is connected in parallel to operational amplifier 54. A resistor 58 is connected between operational amplifier 54 and ground. A first comparator 60 is connected to operational amplifier 54. An adjustable potentiometer 62 is connected to first comparator 60. A field effect transistor (FET) 64 is connected between first comparator 60 and peltier semiconductor 32. A second comparator 66 is connected to operational amplifier 54. A variable potentiometer 68 is connected to second comparator 66.

A power controller 70 is connected to daughter board 18. A power supply 71 and a three terminal regulator 72 are connected to and provide power to daughter board 18. Regulator 72 can be a LM317. A differential amplifier 74 is also connected to daughter board 18 via a pair of gain and balance setting resistors 76 and 78. A resistor 80 is connected between differential amplifier 74 and ground and a resistor 82 is connected in parallel with differential amplifier 74. A resistor 84 is connected to the output of differential amplifier 74. An operational amplifier 88 is connected to resistor 84. A resistor 90 is connected in parallel with operational amplifier 88. A precision stable voltage reference 92 is connected to operational amplifier 88 via a resistor 94. Reference 92 is similar to those used in digital volt meters and is accurate to within one half of one percent.

A comparator 96 is connected to reference 92 via a resistor 97 and a variable potentiometer 98 is connected to comparator 96. A comparator 100 is also connected to resistor 97 and a variable potentiometer 102 connected is to comparator 100. A NAND gate 104 is connected to comparators 96 and 100.

Operational amplifier 88 is connected via a resistor 110 to the adjustment input of regulator 72. A resistor 112 is connected between resistor 97 and the output of regulator 72. A diode 114 is connected between the output of comparator 96 and the adjustment input of regulator 72. Resistor 110 is also connected to the output of regulator 72 via a resistor 116.

Environmental controller 50 and power controller 70 are both connected to an OR gate 120. A clock generator 122 is connected to OR gate 120 and to daughter board 18. Clock generator 122 provides timing signals to computer elements 22, 24 and 26. A resistor 124 and a light 126 are connected in series to the output of OR gate 120 and voltage source +V.

The operation of enhancer 10 is believed to be as follows. The daughter board 18 contains the speed critical logic of a computer. The cold plate 30, peltier semiconductor 32 and hot plate 34 act as a heat pump to lower the temperature of computer elements 22, 24 and 26. Heat is dissipated by fins 38.

Temperature sensor 31 produces a current proportional to absolute degrees Kelvin. Operational amplifier 54 normalizes the current against temperature and produces a voltage against temperature output. This output goes to comparator 60 whose other input is a voltage which is set by potentiometer 62 to be a first temperature set point. When the temperature of sensor 31 is above this first temperature set point, the comparator 60 has a positive input which is above the set point input, and the comparator 60 output is then high. FET 64 is turned on and current then flows through peltier semiconductor 32 and the temperature of cold plate 30 is lowered. When cold plate 30 is below the first temperature set point, the current to peltier semiconductor 32 is turned off. The cold plate 30 is held within a fraction of a degree centigrade of the temperature desired. The cold plate 30 can lower the temperature of computer elements 22, 24 and 26 from 85° C. to 0° C.

The output of operational amplifier 54 also goes to comparator 66. Potentiometer 68 is set to provide a voltage proportional to a second temperature set point. When sensor 31 drops below the second temperature set point, the output of comparator 66 goes low on a line 130.

Power supply 71 provides power to the daughter board 18. The local voltage at computer elements 22, 24 and 26 is detected by the differential amplifier 74. The output of differential amplifier 74 is connected to the precision operational amplifier 88 through the summing resistor 84. This output is accurately related to the local voltage at computer elements 22, 24 and 26 of daughter board 18. Another input to operational amplifier 88 comes from voltage reference 92, through resistor 94. Reference 92 provides a negative voltage −V. As stated above, voltage reference 92 is accurate to within half of a percent.

The output of operational amplifier 88, whose gain is set by the value of resistor 90, is proportional to the difference between the local power supply voltage and the desired operating voltage, as set by reference 92. This signal level is shifted by resistors 110 and 116 and is sent to regulator 72 via a line 132. Regulator 72 corrects the voltage at daughter board 18, responsive to this error signal.

The output of regulator 72 is connected to resistor 112 which in turn is connected to the negative input terminal of comparator 96 and the positive input terminal of comparator 100. Potentiometers 98 and 102 are set at the maximum and minimum volage limits respectively. When the local voltage is within the correct operating limits, the outputs of both comparators 96 and 100 go high. The signals are combined at NAND gate 104 and NAND gate 104 goes low on a line 134. The output of comparator 96 goes low when the local voltage is above the maximum allowed and the signal acts as a power supply disable signal to shut off the power going to daughter board 18 by forward biasing diode 114.

When both the temperature and voltage are within the predetermined limits, both lines 130 and 134 are low. When this occurs, OR gate 120 causes the dual speed clock generator 122 to run at a higher frequency. Indicator light 126 is also lit. Thus, the critical computer elements 22, 24 and 26 are operated at a high speed only when operating voltage and temperature are at the values required for best results.

FIG. 2 is a diagram of an alterative embodiment of a portion of the environmental controller 50 of FIG. 1 and is designated by teh general reference number 300. Circuit 300 can replace circuit 302 of controller 50. This embodiment provides feedback and stabilizing loops for continuous analog control of the temperature.

Circuit 300 comprises a stabilizing circuit of a resistor 310 and a capacitor 311 connected in parallel. A capacitor 312 and a resistor 313 are connected in series to capacitor 311. One input of an operational amplifier 314 is connected to resistor 310. A resistor 316 is connected in series to the other input terminal of the operational amplifier 314 and a potentiometer 318 is connected between ground and the potential source +V. A resistor 322 is connected to resistor 316 and the input of operational amplifier 314. A field effect transistor 324 is connected to the output of operational amplifier 314 and a resistor 326 is connected between ground and the FET 324.

In operation, a voltage is developed across resistor 326 proportional to the current flowing through FET 324 and the peltier semiconductor 32. This voltage is fed back to the input of operational amplifier 314 via resistor 322. Operational amplifier 314 receives the normalized temperature voltage from operational amplifier 54. Potentiometer 318 is set to provide a temperature set point. The result is continuous analog control of the flow of power to peltier semiconductor 32.

FIG. 3 shows a cross-sectional view of an altenrative embodiment of the temperature controlled environment apparatus and referred to by the general reference number 400. The embodiment 400 can replace embodiment 17 of FIG. 1. In embodiment 400, a daughter board 410 is in electrical communication with the mother board 12 via the connector 20. Critical computer elements 416 are connected to daughter board 410. A cold plate 418 with a temperature sensor 420 are connected to elements 416. A peltier effect semiconductor 422 is connected to cold plate 418 and a hot plate 424 is connected to the opposite side of semiconductor 422. The daughter board 410, temperature sensor 420 and semiconductor 422 are connected to a power controller, environmental controller and a clock generator is shown in FIG. 1.

Hot plate 424 is mounted directly onto a surface 426 in a computer. Surface 426 should be of a material of high thermal conductivity which can act as a heat sink. For example, surface 426 may be the outer case of a power supply. The power supply would typically have a cooling air flow circulating through it.

A coating 430 is the sprayed over the daughter board 410, elements 416, cold plate 418, sensor 420, semiconductor 422 and hot plate 424. This coating is of a low thermal conductivity and forms a barrier to eliminate condensation and heat leakage. The coating can be of a polyurethane plastic. Embodiment 400 thus eliminates the need to have a special housing and heat sink in a computer.

FIG. 4 shows a side elevation view of another embodiment of a temperature controlled environmental apparatus and referred to by the general reference number 500. A plurality of critical computer elements 510 in their die form (without plastic or ceramic packaging) are bonded to an interconnect 512 having a plurality of pins 514. This is in contrast to embodiment 17 of FIG. 1 and 400 of FIG. 3 where the computer elements are in their plastic or ceramic housing when attached to cold plate 30 or 430. A cold plate 516 and a temperature sensor 518 are attached to interconnect 512. A peltier effect semiconductor 520 is attached to cold plate 516 and a hot plate 522 is attached to semiconductor 520. Electrical connections are made to a power controller, environmental controller and a clock generator similar to that shown in FIG. 1.

Embodiment 500 combines the computer elements and refrigerator feature into a single assembly. The performance of the computer elements is further enhanced because optimum thermal coupling occurs between the elements and the cooler. This allows more elements to be put into a smaller area than is presently permissible. This embodiment is very practical for many currently produced computer elements such as the 80386 of Intel Corporation.

FIG. 5 shows a graph of the propagation delay versus temperature for a typical CMOS computer element. These elements typically operate at up to 85° C. With this embodiment of the present invention, the environmental temperature of the element can be maintained at around 0° C. The relative propagation delay between these two temperatures is 1.22 to 0.9. This means that there is an approximate thirty percent increase in speed of operation of the element when its temperature is maintained at 0° C.

FIG. 6 shows a graph of propagation delay relative to supply voltage for a typical CMOS element. Voltage variances in typical power supplies for a semiconductor computing elements can vary up to plus or minus five percent. This is because controlling the voltage to tighter limits has been assumed to be too difficult and expensive relative to the cost of the desk top computers. System performance has been determined by designing the computer system to operate at their worst case of voltage variance. A typical worst case voltage currently used is 4.75 volts.

The precision power supply controller of the present invention allows a computer element to be operated closer to optimum voltage. The voltage source can be operational at 5.25 because voltage can be maintained within half of a percent. The relative propagation delay decreases from 1.07 to 0.94. This is an increase of greater than ten percent in computer element operating speed.

The present invention is thus able to obtain the multiple benefits of better temperature and power control. Increases in computer element speeds of greater than twenty-five percent are possible. The present invention is very inexpensive when compared with the price of the computer element sets used in desk top computers today and is a very practical way to increase desk top computer speed. The low temperature operation of the computing devices lengthens their life and compensates for any shortening of their life due to operation at higher then normal voltages.

Other embodiments are possible. For example, the power controller and environmental controller can be implemented separately in a computer system. The increase in computer speed would of course be less than if both are implemented together as in the preferred embodiment.

The power controller can be implemented in a different way. As shown in FIG. 1 the controller 70 uses a linear power control scheme. However, an alternative embodiment using switching regulators can be used.

The present invention can also be implemented using multiple peltier devices. A number of these devices can be connected in parallel to provide greater heat pumping capacity. These devices can also be connected in series to provide multiple stages. The multiple stages allow the temperature of the computer element to be maintained at temperatures even lower than 0° C. and thus, further increase the operating speed of the computer element.

Although the present invention has been described in terms of the presently preferred embodiments, it is to be understood that such disclosure is not to be interpreted as limiting. Various alternations and modifications will no doubt become apparent to those skilled in the art after having read the above disclosure. Accordingly, it is intended that the appended claims be interpreted as covering all alternations and modifications as fall within the true spirit and scope of the invention.

I claim:

1. A computer element performance enhancer for increasing the speed of a computer element comprising:
   a peltier device thermally connected to a computer element for maintaining the computer element at a temperature below ambient; and
   an enclosure surrounding and hermetically sealing the computer element and the peltier device, said enclosure containing a water free environment for preventing condensation from forming.

2. A computer element performance enhancer for increasing the speed of a computer element comprising:
   a temperature controlled environment apparatus having a cooling device thermally connected to a computer element, a temperature sensor thermally connected to said computer element for generating a temperature signal, a hermetically sealed enclosure containing a water free environment surrounding said cooling device and said temperature sensor; and
   a cooling device controller means connected to said cooling device and said temperature sensor for regulating a flow of power to said cooling device responsive to said temperature signal, such that said computer element maintains a predetermined temperature range.

3. The enhancer of claim 2 wherein,
   said enclosure has a thermal insulating portion and a thermal conducting portion, said thermal conducting portion in thermal communication with said cooling device.

4. The enhancer of claim 3 wherein,
   said thermal conducting portion comprises a surface of a high thermal conductivity material located inside a computer.

5. The enhancer of claim 2 wherein,
   said computer element is mounted to a circuit board and said circuit board is located within said enclosure.

6. A method for increasing the speed of a computer element comprising the steps of:
   enclosing a computer element and a peltier device within a hermetically sealed enclosure containing a water free environment, said peltier device being in thermal communication with said computer element;
   generating a temperature signal proportional to the temperature of said computer element;
   comparing said temperature signal to a predetermined temperature set point; and
   sending a flow of current to said peltier device if said temperature signal is greater than said set point.

7. A computer element performance enhancer for increasing the speed of a computer element comprising:
   a temperature controlled environment apparatus having a peltier device thermally connected to a computer element, a temperature sensor thermally connected to said computer element for generating a temperature signal;
   a peltier device controller means connected to said peltier device and said temperature sensor for regulating a flow of power to said peltier device responsive to said temperature signal such that said computer element maintains a predetermined temperature range, and for generating an environmental controller signal when said computer device is within said predetermined temperature range; and
   a dual speed clock generator connected to the peltier device controller means and said computer element.

8. A method for increasing the speed of a computer element comprising the steps of:
   generating a temperture signal proportional to the temperature of a computer element;
   comparing said temperature signal to a predetermined temperature set point;
   sending a flow of current to a peltier device in thermal communication with said computer element if said temperature signal is greater than said set point;
   comparing said temperature signal to a predetermined clock change set point;
   generating a clock change signal if said temperature signal is below said clock change set point; and
   increasing the speed of a clock generator connected to said computer element responsive to said clock change signal.

9. The enhancer of claim 7 further including,
   a power controller comprising an adjustable power supply connected to said computer element, a power supply controller means connected to said adjustable power supply, said computer element and said clock generator; said power supply controller means for regulating a voltage of said adjustable power supply responsive to a local voltage of said computer element such that said local voltage maintains a predetermined voltage range; said power supply controller generates a power controller signal when said local voltage is within said predetermined voltage range.

10. A computer element performance enhancer for increasing the speed of a computer element comprising:
a power controller comprising an adjustable power supply connected to a computer element, a power supply controller means connected to said adjustable power supply and said computer element for regulating a voltage of said adjustable power supply responsive to a local voltage of said computer element such that said local voltage maintains a predetermined voltage range, said power supply controller means generating a power controller signal when said local voltage is within said predetermined voltage range; and
a dual speed clock generator connected to the power controller and said computer element.

11. The device of claim 10 wherein,
said power supply controller means comprises a precision stable voltage reference which is accurate to within 0.5 percent.

12. A method for increasing the speed of a computer element comprising the steps of:
generating a temperature signal proportional to the temperature of a computer element;
comparing said temperature signal to a predetermined temperature set point;
sending a flow of current to a peltier device in thermal communication with said computer element if said temperature signal is greater than said set point;
comparing said temperature signal to a predetermined clock change set point;
generating a temperature clock change signal if said temperature signal is below said clock change set point;
sampling a local voltage of said computer element;
comparing said local voltage with a reference voltage and generating a power correction signal responsive thereto;
regulating an adjustable power supply connected to said computer element responsive to said power correction signal;
comparing said power correction signal with a predetermined maximum and minimum value;
generating a power clock change signal if said power correction signal is between said predetermined maximum and minimum values; and
increasing the speed of a clock generator connected to said computer element if said temperature clock change signal and said power clock change signal are present.

13. A computer element performance enhancer for increasing the speed of a computer element comprising:
a hot plate;
a peltier semiconductor thermally connected to said hot plate;
a cold plate thermally connected intermediate to the peltier device and a computer element; and
an enclosure surrounding and hermetically sealing the hot plate, the peltier semiconductor, the cold plate and the computer element, the enclosure having a thermal conducting portion and a thermal insulating portion, said thermal conducting portion in thermal communication with the hot plate and the ambient environment outside the enclosure, said thermal insulating portion for thermally insulating the peltier semiconductor, cold plate and computer element from the ambient environment.

14. The enhancer of claim 13 further including,
electrical conducting means for providing a flow of electrical current to the computer element, the electrical conducting means passing through the enclosure and connected to the computer element, the cold plate being thermally insulated from the electrical conducting means.

15. A method for increasing the speed of a computer element comprising the steps of:
sampling a local voltage of said computer element;
comparing said local voltage with a reference voltage and generating a power correction signal responsive thereto;
regulating and adjustable power supply connected to said computer element responsive to said power correction signal;
comparing said power correction signal with a predetermined maximum and minimum value; and
increasing the speed of a clock generator connected to said computer element if said power clock change signal is present.

* * * * *